United States Patent
Garg et al.

(10) Patent No.: US 9,723,153 B2
(45) Date of Patent: Aug. 1, 2017

(54) METHODS AND SYSTEMS FOR CALL DETAIL RECORD GENERATION FOR BILLING SYSTEMS

(71) Applicant: Affirmed Networks, Inc., Acton, MA (US)

(72) Inventors: Deepak Garg, Nashua, NH (US); Srinivas Kappla, Nashua, NH (US); Philip To, Lexington, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 0 days.

(21) Appl. No.: 15/148,695

(22) Filed: May 6, 2016

(65) Prior Publication Data
US 2016/0330328 A1 Nov. 10, 2016

Related U.S. Application Data

(60) Provisional application No. 62/158,260, filed on May 7, 2015.

(51) Int. Cl.
*H04W 4/24* (2009.01)
*H04M 15/00* (2006.01)
*H04L 12/14* (2006.01)

(52) U.S. Cl.
CPC ........ *H04M 15/41* (2013.01); *H04L 12/1407* (2013.01); *H04M 15/43* (2013.01);
(Continued)

(58) Field of Classification Search
None
See application file for complete search history.

(56) References Cited

U.S. PATENT DOCUMENTS

| 5,027,388 A | 6/1991 | Bradshaw et al. |
| 8,522,241 B1 | 8/2013 | Vohra et al. |
(Continued)

FOREIGN PATENT DOCUMENTS

| JP | 2002-319963 A | 10/2002 |
| JP | 2010088013 A | 4/2010 |
(Continued)

OTHER PUBLICATIONS

Extended European Search Report issued by the European Patent Office for European Patent Application No. 12868870.2 dated Sep. 4, 2015 (10 pgs.).
(Continued)

*Primary Examiner* — Diane Mizrahi
(74) *Attorney, Agent, or Firm* — Wilmer Cutler Pickering Hale and Dorr LLP

(57) ABSTRACT

A system and method for generating Call Detail Records (CDR) to optimize network usage notifications to a mobile device subscriber. The system and method can include a billing system module that determines CDR generation parameters for the mobile device subscriber based on the mobile device subscriber's network usage, including increasing CDR generation when the mobile device subscriber's network usage relative to a predetermined quota is high and/or decreasing CDR generation when the mobile device subscriber's network usage relative to the predetermined quota is low. The CDR generation parameters can be applied to control CDR generation for the mobile device subscriber.

20 Claims, 8 Drawing Sheets

(52) U.S. Cl.
CPC .......... *H04M 15/58* (2013.01); *H04M 15/70* (2013.01); *H04M 15/725* (2013.01); *H04M 15/8278* (2013.01); *H04W 4/24* (2013.01)

(56) References Cited

U.S. PATENT DOCUMENTS

| | | | |
|---|---|---|---|
| 8,620,263 B2* | 12/2013 | Ravishankar | H04L 12/1407 379/114.01 |
| 9,013,993 B2 | 4/2015 | Logan et al. | |
| 9,094,538 B2* | 7/2015 | Mohammed | H04M 15/70 |
| 9,544,751 B2* | 1/2017 | McNamee | H04L 12/1407 |
| 2003/0171114 A1 | 9/2003 | Hastings | |
| 2009/0124284 A1 | 5/2009 | Scherzer et al. | |
| 2009/0300173 A1 | 12/2009 | Bakman et al. | |
| 2010/0035576 A1 | 2/2010 | Jones et al. | |
| 2010/0050172 A1 | 2/2010 | Ferris | |
| 2010/0317331 A1 | 12/2010 | Miller | |
| 2011/0125905 A1 | 5/2011 | Baucke et al. | |
| 2011/0211583 A1 | 9/2011 | Seetharaman et al. | |
| 2012/0030349 A1 | 2/2012 | Sugai | |
| 2012/0257499 A1 | 10/2012 | Chatterjee et al. | |
| 2013/0095815 A1 | 4/2013 | Venkatraman et al. | |
| 2013/0132854 A1* | 5/2013 | Raleigh | G06F 3/0482 715/738 |
| 2013/0173804 A1 | 7/2013 | Murthy et al. | |
| 2013/0231080 A1* | 9/2013 | Cheuk | H04M 15/765 455/405 |
| 2013/0267196 A1 | 10/2013 | Leemet et al. | |
| 2014/0098671 A1 | 4/2014 | Raleigh et al. | |
| 2014/0187199 A1* | 7/2014 | Yan | H04W 48/02 455/410 |
| 2015/0222546 A1* | 8/2015 | Van Phan | H04W 36/0005 709/226 |
| 2016/0269566 A1 | 9/2016 | Gundamaraju et al. | |

FOREIGN PATENT DOCUMENTS

| | | |
|---|---|---|
| JP | 2011-259440 A | 12/2011 |
| WO | WO-2010066430 A1 | 6/2010 |

OTHER PUBLICATIONS

Gomez Rodriguez, M. et al., "A 3GPP System Architecture Evolution Virtualized Experimentation Infrastructure for Mobility Prototyping (Invited Paper)", Proc. Of the 4th International Conference on Testbeds and Research Infrastructures for the Development of Networks & Communities, 10 pgs. (Mar. 18, 2008).

International Search Report and Written Opinion as issued by the U.S. Patent and Trademark Office as international searching authority, issued in PCT/US16/31194, dated Aug. 16, 2016 (7 pages).

International Search Report and Written Opinion issued by the U.S. Patent and Trademark Office as International Searching Authority for International Patent Application No. PCT/US16/21744 mailed Jun. 9, 2016 (8 pages).

Taniguchi, Y. et al., "Implementation and Evaluation of Cooperative Proxy Caching System for Video Streaming Services," Technical Report for the Institute of Electronics Information and Communication Engineers, IEICE, Japan, vol. 103, No. 650, pp. 13-18 (Feb. 5, 2014)—English abstract.

* cited by examiner

METHODS AND SYSTEMS FOR CALL DETAIL RECORD GENERATION FOR BILLING SYSTEMS

CROSS REFERENCE TO RELATED APPLICATIONS

This application claims priority under 35 U.S.C. §119(e) to U.S. Provisional Application No. 62/158,260, filed May 7, 2015, entitled "Methods and Systems for Call Detail Record Generation for Billing Systems," the contents of which is incorporated herein it its entirety.

FIELD OF INVENTION

The invention generally relates to the generation of call detail records in a communication network system.

DESCRIPTION OF RELATED ART

When a mobile device subscriber uses a device connected to a communication network to perform a transaction (e.g., voice call, SMS message, data transaction), the network will generate a call detail record (CDR) that describes characteristics about the mobile device subscriber's network session. For example, a CDR may contain information about the session's date and time, duration, type (e.g., calls and data) and amount of network resource usage. CDRs help mobile carriers calculate and report mobile device subscribers' usage of resources on their networks and determine overage (i.e., if any mobile device subscribers have exceeded their mobile device network plans' usage cap), and ultimately to bill the mobile device subscriber for use of the network.

Given the proliferation of mobile devices (e.g., smartphones, tablets and laptops) used by an individual or a family requiring access to a network to communicate, mobile network operators offer shared mobile device network data plans. These shared plans allow mobile device subscribers to pay for a single pool of data and share it across multiple devices and among other family members. Under these shared plans, mobile device subscribers are allotted (e.g., on a per month basis) a network usage quota, which includes data volume, and may also include a predetermined number of call minutes and texts. Mobile device subscribers that exceed their plans' usage limits will be subject to extra charges. Therefore, it is important that mobile device subscribers receive accurate and current information about their network usage, including whether they are approaching their plans' limits so they may adjust their use accordingly.

Network operators typically configure networks to generate CDRs based on fixed intervals. These intervals can be based on time and/or volume of data thresholds and are the same across all mobile device subscribers. Thus, regardless of a mobile device subscriber's network usage or data plan, the network will generate CDRs at fixed intervals. Such systems fail to take into account that 1) mobile device subscribers who are fast approaching their plans' usage limits need information about their usage at shorter intervals than the fixed intervals and 2) mobile device subscribers who are nowhere near their plans' data limits do not need information about their usage as often as the fixed intervals. This prior art technique for generating CDRs is inadequate because it ends up generating too few CDRs for individuals approaching their data limits, which results in inaccurate usage reporting and a failure to notify mobile device subscribers in time that they are approaching their plans' usage limits. Conversely, this known technique ends up generating too many CDRs for individuals far away from their usage limits, which results in overwhelming operators' processing and billing systems and causes overall CDR processing delays.

One solution attempted by network operators to improve accuracy and timeliness of data usage calculation and reporting is to uniformly reduce the fixed intervals based on time and/or data volume thresholds for generating CDRs. However, this increases CDR volume drastically and burdens operators' processing and billing systems.

Embodiments of the disclosed subject matter are directed to adjusting CDR generation to a level suitable for each mobile device subscriber, or a group of mobile device subscribers part of a shared plan or having similar network usage characteristics. This reduces the overall volume of CDR generation, and helps to timely and accurately calculate and report total data usage, without overwhelming operators' processing and billing systems.

SUMMARY OF THE INVENTION

Systems and methods are disclosed herein for generating Call Detail Records (CDR) to optimize network usage notifications to a mobile device subscriber. In some embodiments, the systems and methods include a billing system module that determines CDR generation parameters for the mobile device subscriber based on the mobile device subscriber's network usage, including increasing CDR generation when the mobile device subscriber's network usage relative to a predetermined quota is high and/or decreasing CDR generation when the mobile device subscriber's network usage relative to the predetermined quota is low. The billing system module transmits CDR generation parameters to a Policy Charging and Enforcement Function (PCEF) module; and the PCEF module applies the received CDR generation parameters to control CDR generation for the mobile device subscriber.

In some embodiments, the CDR generation parameters applied by the PCEF module is based on a predetermined time threshold and/or a predetermined data volume threshold.

In some embodiments, the billing system module determines the CDR generation parameters, based on increasing CDR generation when the mobile device subscriber's network usage reaches a first predetermined percentage of a network usage limit on the mobile device subscriber's mobile device network plan and/or decreasing CDR generation when the mobile device subscriber's usage is below a second predetermined percentage of the network usage limit on the mobile device subscriber's mobile device network plan.

In some embodiments, the billing system determines the CDR generation parameters by adjusting the CDR generation parameters based on a count of a number of members participating in the mobile device subscriber's mobile device network plan.

In some embodiments, the billing system determines the CDR generation parameters by adjusting the CDR generation parameters based on the mobile device subscriber's past network usage behavior.

In some embodiments, the billing system determines the CDR generation parameters by adjusting the CDR generation parameters based on a billing cycle of the mobile device subscriber's mobile device network plan and independent of the mobile device subscriber's network usage, wherein a higher number of CDRs are generated at the end of the billing cycle than at the beginning of the billing cycle.

In some embodiments, the billing system module includes a database for storing information about the mobile device subscriber, the information including current and historical network usage for the mobile device subscriber and/or mobile device network plan information for call and data usage limits for the mobile device subscriber.

In some embodiments, the mobile device subscriber includes one an individual mobile device subscriber, a group of mobile device subscribers that are part of a shared mobile device network plan and a group of mobile device subscribers that subscribe to the same mobile device network plan and have similar network usage characteristics.

In some embodiments, the subscriber has multiple mobile devices registered under a single mobile device network plan, and the mobile device subscriber's network usage is based on the multiple mobile devices' network usage.

In some embodiments, the system and methods further include a Policy Control and Charging Rules Function (PCRF) module that transmits information about current network usage by the mobile device subscriber to the billing system module.

These and other capabilities of the disclosed subject matter will be more fully understood after a review of the following figures and detailed description.

BRIEF DESCRIPTION OF THE DRAWINGS

For a more complete understanding of various embodiments of the disclosed subject matter, reference is now made to the following descriptions taken in connection with the accompanying drawings in which.

DETAILED DESCRIPTION

Embodiments of the disclosed subject matter can provide techniques for intelligently generating call detail records for billing systems based on mobile device subscribers' network consumption behavior or other criteria. For example, certain implementations are able to generate CDRs more frequently for mobile device subscribers as they approach their mobile device network plan's network resource usage limit and less frequently for the mobile device subscribers that are nowhere near their limit. Adjusting CDR generation to a level suitable for an individual mobile device subscriber can help eliminate unnecessary CDR generation and improve accuracy and timeliness in reporting and calculating mobile device subscribers' network resource usage.

A mobile device subscriber includes an individual mobile device subscriber of a mobile device network plan, a group of mobile device subscribers that are part of a shared mobile device network plan or a group of mobile device subscribers that subscribe to the same mobile device network plan and have similar network usage characteristics (e.g., use less than 50% of their plan's usage quota each billing cycle). A mobile device subscriber may register a single mobile device or multiple mobile devices under a single mobile device network plan. If the mobile device subscriber registers multiple mobile devices under a single mobile device network plan, then the mobile device subscriber's network usage covers all the mobile devices registered under the plan.

Figure 1:
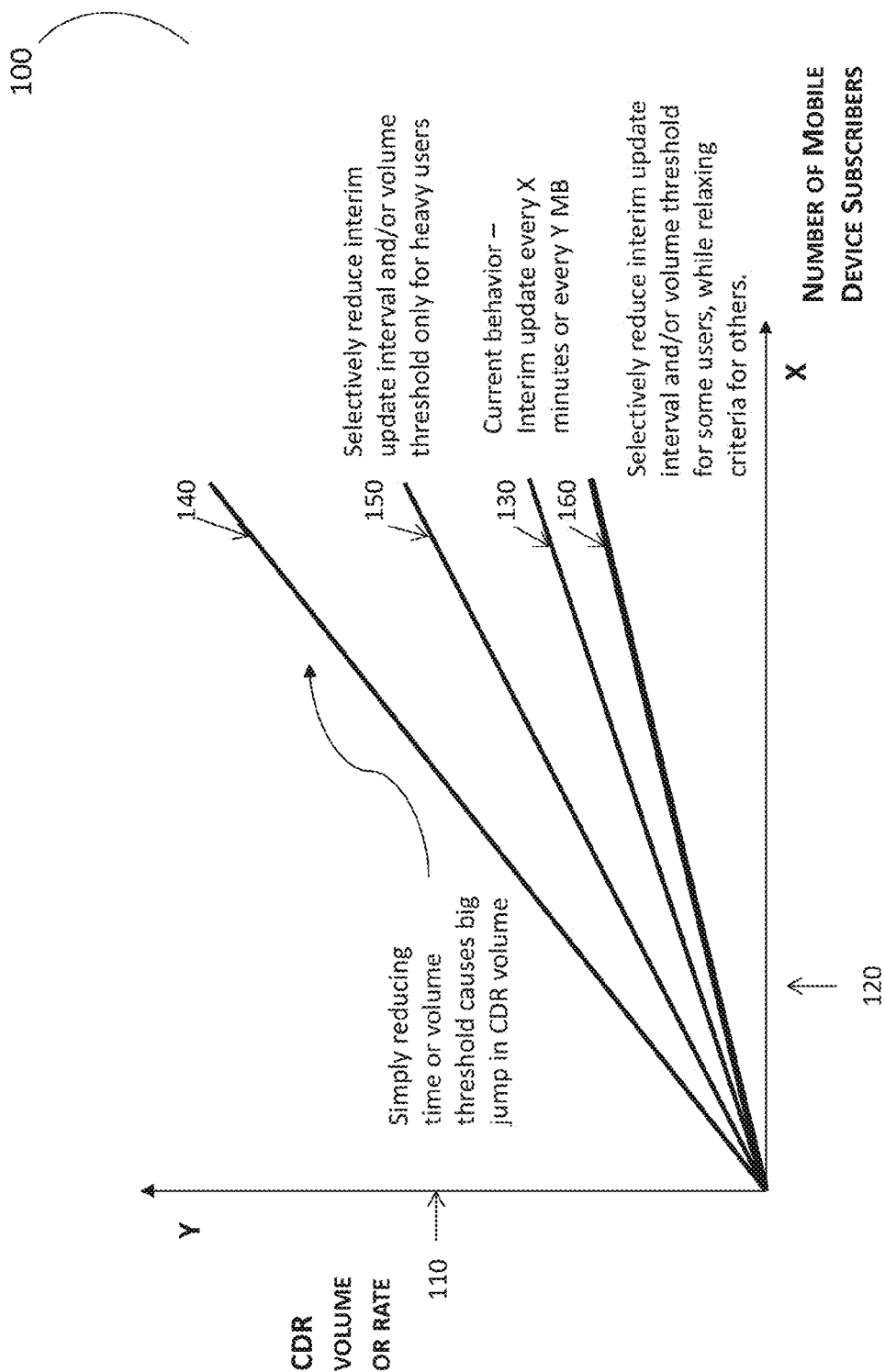
FIG. 1 illustrates a graph of different CDR generation techniques.

FIG. 1 illustrates a graph 100 that shows the relationship between the number of mobile device subscribers and the CDR volume or frequency rate when different techniques are used for generating CDRs. The graph shown in FIG. 1 includes a y axis 110 that represents the frequency rate or volume of CDRs, and an x axis 120 that represents the number of mobile device subscribers. Line 130 represents the well-known technique for generating CDRs at fixed intervals based on time and/or data volume thresholds (e.g., generating a CDR every five minutes, or every ten megabytes (MB) of data) for all mobile device subscribers, and shows the impact of this technique on the frequency rate or volume of CDRs in relation to the number of mobile device subscribers. The problem with this technique is that the fixed time intervals or data volume thresholds often do not keep up with the speed at which the CDR information is needed. As a quick fix, if operators want to obtain faster and more accurate updates about mobile device subscriber network resource usage, operators often reduce the update interval by decreasing the time and/or data volume thresholds, which causes a big jump in CDR generation frequency rate or volume as represented by line 140 (compared to line 130). However, long term, this increase in CDR generation frequency rate or volume usually does not have the desired outcome of providing faster and more accurate updates about mobile device subscriber network resource usage. Rather, the flood of CDRs generated tends to overwhelm CDR processing and billing systems, causing usage notifications to mobile device subscribers to be delayed and/or to be inaccurate.

In contrast to the known technique of generating CDRs at fixed intervals, some embodiments of the disclosed subject matter selectively reduce CDR update intervals (i.e., increase CDR generation) only for mobile device subscribers who use substantial network resources ("heavy users"). This technique is represented by line 150, and, compared to line 140, results in lower CDR volume or frequency rate. Other embodiments of the disclosed subject matter, represented by line 160, selectively reduce CDR update intervals for some users (e.g., heavy network users), while increasing the CDR update intervals for other users (e.g., light network users). Comparing line 160 with the current CDR generation technique 130, overall CDR generation frequency rate or volume is much lower. By adjusting the update intervals to intelligently match mobile device subscriber network resource consumption, overall CDR generation frequency rate or volume is reduced. This reduction can help reduce the strain on CDR processing and billing systems, as well as improve the accuracy and efficiency of reporting mobile device subscribers' total network usage.

Figure 2:
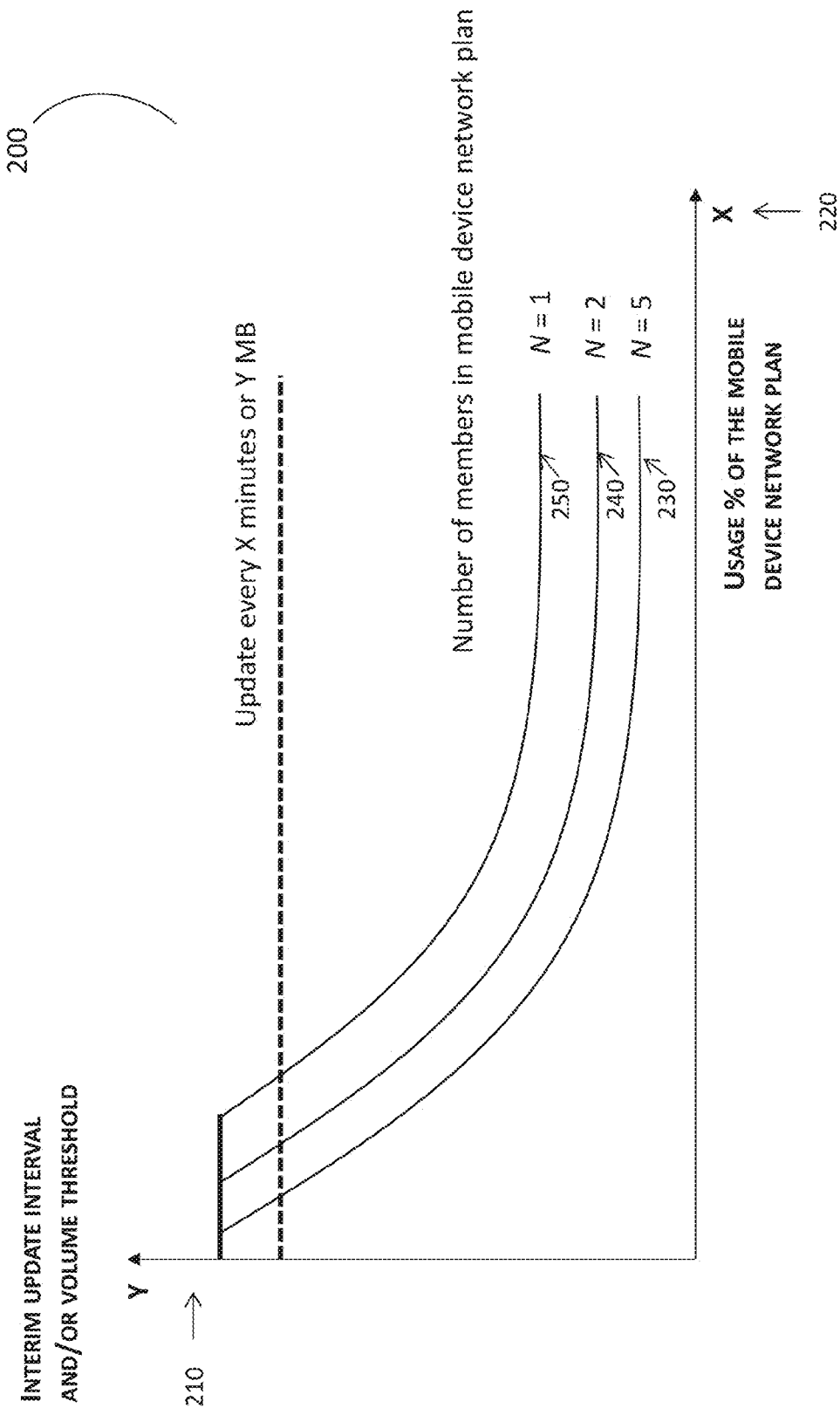
FIG. 2 illustrates a graph that represents the relationship between CDR generation and mobile device network plan usage.

FIG. 2 illustrates a graph 200 showing the relationship between the interim update interval for CDR generation (as represented by the y axis 210) for each individual within the mobile device network plan and the percentage of usage of a mobile device network plan (as represented by the X axis 220). The update interval can be based on either a time threshold (e.g., generate a CDR after every five minutes of network usage) and/or a data volume threshold (e.g., generate a CDR after every five megabytes of network usage). In an embodiment of the disclosed subject matter, as usage of a mobile device network plan approaches its maximum allowed usage quota for the billing cycle, the CDR generation interim update interval will decrease. Thus, mobile device subscribers at risk of exceeding their plan's network usage limit will be notified more frequently about their network usage. Conversely, when the percentage of the mobile device network plan's network usage is low, and the mobile device subscribers are not close to exceeding their plan's network usage limit, the CDR generation interim update interval will increase. Thus, mobile device subscribers nowhere near exceeding their plans' limits will receive updates about their network usage less frequently. For example, when the mobile device subscribers' network usage has reached 90% of their mobile device network plan's maximum allowed quota for the current billing cycle, then the CDR generation interim update interval will decrease, and the mobile device subscribers will receive more frequent updates about their network usage. In contrast, when the mobile device subscribers' network usage is below 20% of their mobile device network plan's maximum allowed quota for the current billing cycle, then the CDR generation interim update interval will increase, and the mobile device subscribers will receive fewer notifications about their network usage.

In some embodiments of the disclosed subject matter, in addition to, or instead of, factoring in mobile device network plan percentage usage, CDR generation interim update intervals can be adjusted to take into account various factors. For example, the interim update interval for CDR generation may be decreased based on the number of members participating in the mobile device network plan. Because the more members participating in a mobile device network plan will likely result in approaching the usage limit of the mobile device network plan faster, it is important that members of the mobile device network plan are notified more frequently about their network usage. In the graph depicted in FIG. 2, line 230 represents five participating family members, line 240 represents two participating family members, and line 250 represents one participating family member. As indicated by the different lines, the more family members participating in the plan, the lower the interim update interval for generating CDRs. In other words, the more family members participating in the mobile device network plan, the more updates they will receive about their network usage.

In other embodiments of the disclosed subject matter, the interim update interval can be adjusted for other factors, including but not limited to, mobile device subscriber's past network usage behavior, and the point in time of the billing cycle for the mobile device network plan (e.g., at the beginning of the billing cycle usage will be lower requiring fewer updates to the mobile device subscribers, while at the end of the billing cycle usage will be greater, requiring more updates). The total CDR frequency rate and/or volume will be determined by the settings of the interval parameters, as well as the number of mobile device subscribers getting close to 100% usage of their mobile device network plan.

Network System Architecture and Definition of the Network System Components

Figure 3:
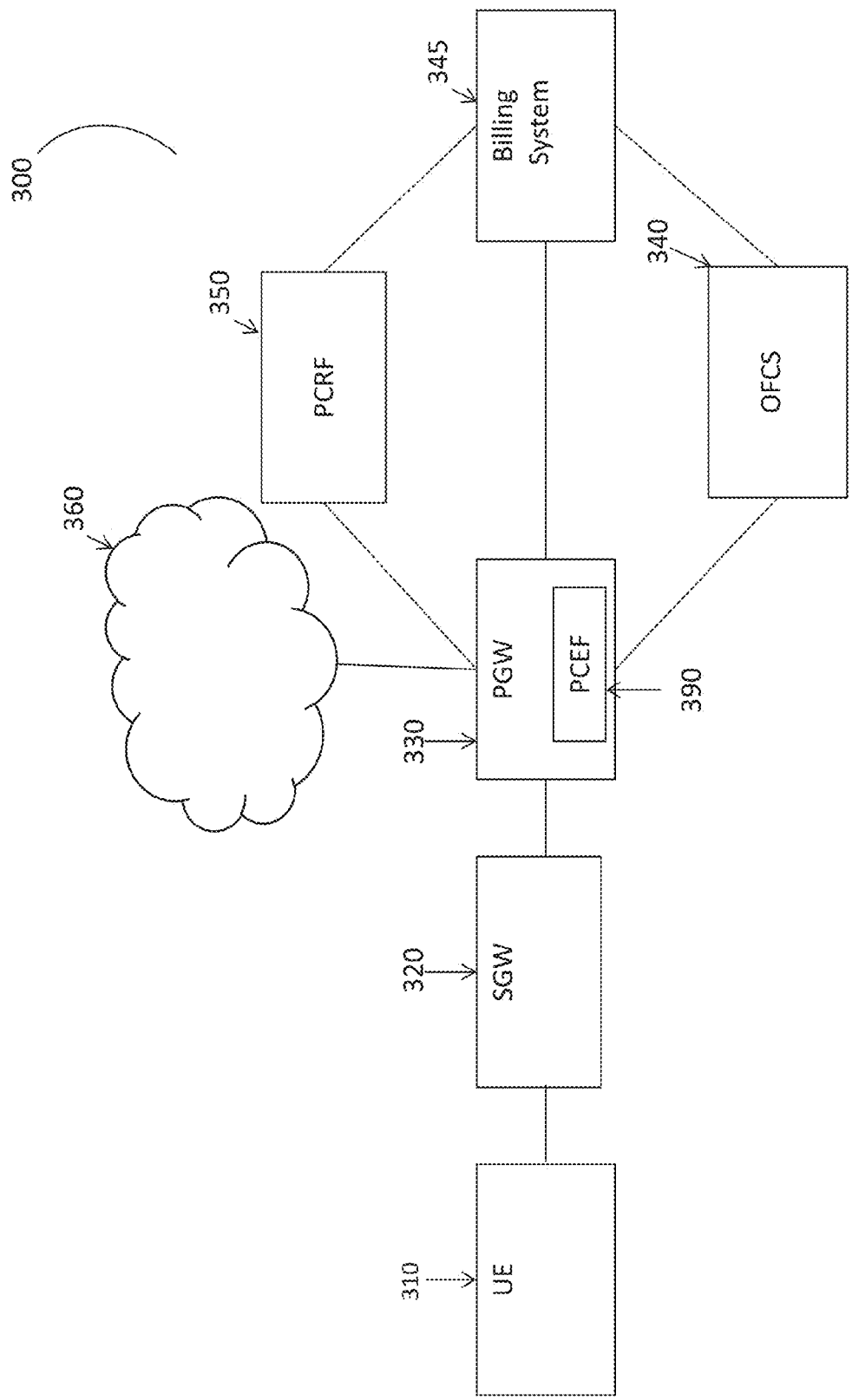
FIG. 3 illustrates a block diagram of a network system for intelligently and dynamically generating CDRs in accordance with some embodiments of the disclosed subject matter.

FIG. 3 illustrates a block diagram of an embodiment of a mobile communications network system 300 in accordance with the disclosed subject matter that can be configured to intelligently and dynamically generate CDRs based on a mobile device subscriber's network consumption behavior or other criteria. Network system 300 includes user equipment (UE) 310, a serving gateway (SGW) 320, a packet data network gateway (PGW) 330, an offline charging system (OFCS) 340, a billing system (BS) module 345, a Policy Control and Charging Rules Function (PCRF) module 350, Policy Charging and Enforcement Function (PCEF) module 390 and a network 360. Additional components such as an Evolved NodeB and a Mobility Management Entity not shown, could also be part of network system 300. The functionality described herein can be combined into a single component or spread across several components.

The type of network utilized by network system 300 can include circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc. Examples of networks can include a wide area network (WAN), a local area network (LAN), a Global System for Mobile Communications (GSM) network, a Code Division Multiple Access (CDMA) network, a Long Term Evolution (LTE) network and a Worldwide Interoperability for Microwave Access (WiMax) network.

User equipment (UE) 310 can be a wireless device (e.g., cellular phone, smart phone, computer, personal digital assistant (PDA) set-top box, Internet Protocol Television (IPTV), electronic gaming device, printer, tablet, Wi-Fi Hotspot) utilized by a mobile device subscriber or user of a wireless communication service to receive or convey data, control, voice, video, sound, gaming, or substantially any data-stream or signaling-stream.

SGW 320 can route and forward user data packets coming from the UE 310 to PGW 330.

PCRF 350 is responsible for policy control decision and flow based charging control functionalities. In some embodiments of the disclosed subject matter, PCRF 350 can provide certain information about a mobile device subscriber to billing system 345 to help billing system 345 determine appropriate CDR generation parameters for that mobile device subscriber. For example, PCRF 350 can receive updates from PCEF 390 about the current usage and report to the billing system 345. PCEF 390 uses a Gx or other suitable protocol to report usage. The CDR generation parameters can include an interim update interval that is based on either time and/or data volume thresholds (e.g., for every 5 minutes of network use and/or for every 5 megabytes of data transmitted on the network, generate a CDR).

In certain embodiments of the disclosed subject matter, PCEF 390, included in network system 300, can be located in PGW 330. PCEF 390 encompasses service data flow detection, policy enforcement and billing related functionalities. Specifically, PCEF 390 is configured to store parameters related to CDR generation and to generate CDRs based on those parameters. For example, PCEF 390 can store for an individual mobile device subscriber named Mr. Smith a CDR interval update based on 3 minutes of network use and/or 7 megabytes of data transmitted on or received from a network. When Mr. Smith uses the network for 3 minutes and/or transmits 7 megabytes of data on the network, then PGW 390 will generate a CDR. Another module, for example, billing system 345, may create the CDR generation parameters that are appropriate for a mobile device subscriber and transmit those CDR generation parameters, either directly or indirectly, to PCEF 390 for application to a mobile device sub scriber.

Further, in some embodiments, the network system 300 includes an offline charging system such as the Offline Charging System (OFCS) 340 used for offline charging. OFCS 340 can collect charging information for network resource usage concurrently with that resource usage. The charging information is ultimately passed to billing system 345. For example, OFCS 340 can receive the generated CDRs from PCEF 390 and pass them along to billing system 345. In other embodiments, PCEF 390 generates CDRs and transmits them directly to billing system 345.

The network system 300 also includes billing system 345. In some embodiments, billing system 345 is controlled by a network services provider (not illustrated) and is responsible for collecting network consumption data, calculating charging and billing information, producing bills and notifications to customers about use, and processing payments. Further, in some embodiments, billing system 345 creates CDR generation parameters appropriate for a mobile device subscriber. For example, if the mobile device subscriber is a heavy network user and has a history of overage, the billing system 345 can create CDR generation parameters that include short interim update intervals based on low time and/or data volume thresholds. These CDR generation parameters can be applied by PCEF 390 to increases CDR generation for that mobile device subscriber, so that the mobile device subscriber will receive usage updates more frequently. In another example, billing system 345 can create CDR generation parameters that correspond to the percentage of the mobile device subscriber's mobile device network plan already depleted. When a low percentage of the mobile device subscriber's mobile device network plan is depleted, the interim update interval for generating CDRs will be long, based on high time and/or data volume thresholds, so that fewer CDRs are generated and the mobile device subscriber will receive fewer usage updates. As the mobile device subscriber uses up a greater percentage of his mobile device network plan, billing system 345 will create shorter update intervals, based on higher time and/or data volume thresholds to increase the frequency of CDR generation. In yet another example, billing system 345 may create CDR generation parameters that correspond to the point in time of the billing cycle. At the beginning of the billing cycle, when usage is likely to be low, billing system 345 will create longer update intervals, based on high time and/or data volume thresholds, decreasing the number of CDRs that are generated. As the billing cycle progresses and usage increases, billing system 345 will reduce the interim update interval, based on lower time and/or data volume thresholds, so that more CDRs are generated.

In some embodiments, billing system 345 can also include a database storing information about a mobile device subscriber such as a mobile device subscriber's profile, a mobile device subscriber's current and historical network resource usage and a mobile device subscriber's mobile device network plan information for call and data usage limits. This information can be used by billing system 345 to create personalized and dynamic CDR generation parameters for a mobile device subscriber.

Figure 4:
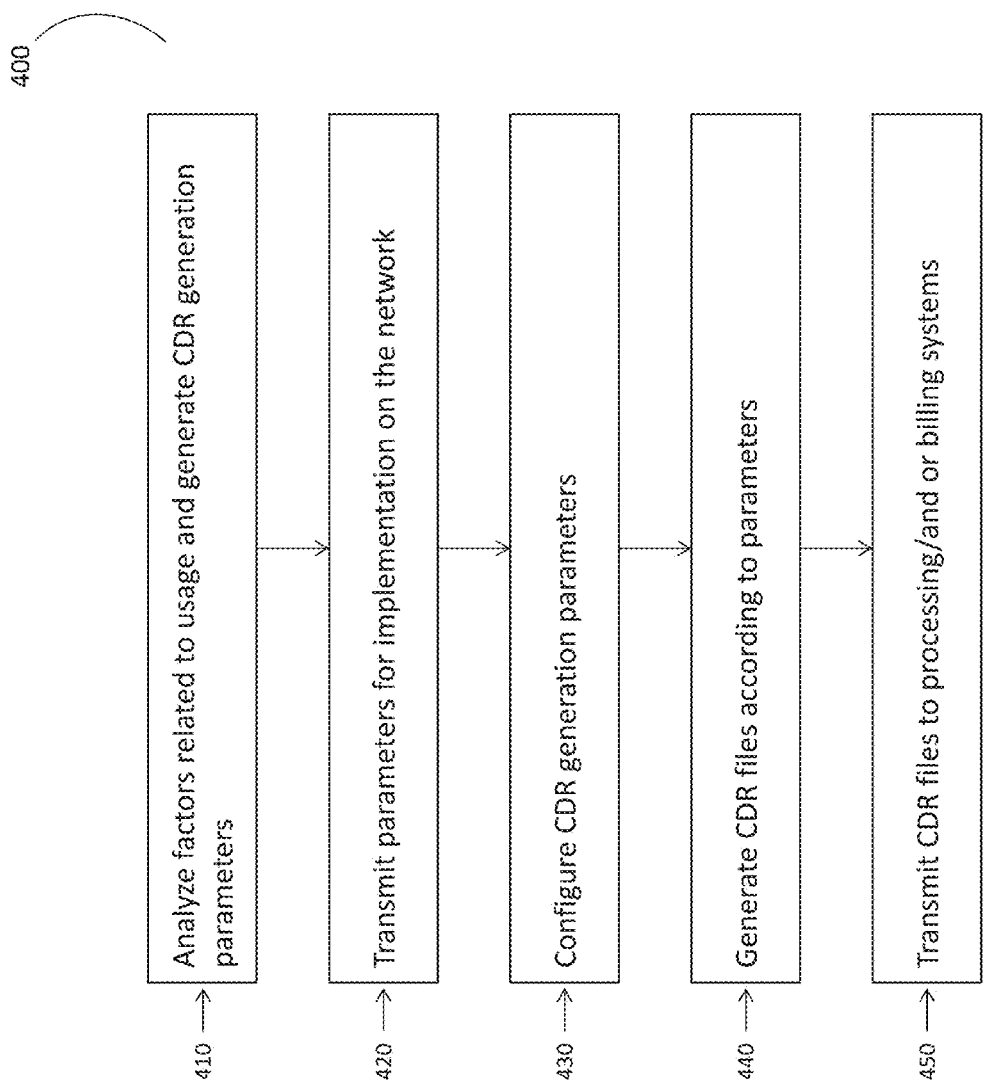
FIG. 4 is a process flow diagram of a method for use with the network system of FIG. 3 in accordance with some embodiments of the disclosed subject matter.

FIG. 4, with further reference to FIG. 3, shows at a high level, the operation of a process 400, in accordance with some embodiments of the disclosed subject matter, for intelligently and dynamically creating CDR generation parameters. Process 400 can use the network system 300, and includes the steps set forth below.

At step 410, billing system 345 analyzes one or more factors (e.g., mobile device subscriber's usage history, mobile device subscriber's mobile device network plan, percentage of mobile device subscriber's mobile device network plan already depleted, point in time of the billing cycle) and develops parameters for generating CDRs appropriate for a mobile device subscriber.

At step 420, billing system 345 transmits the CDR generation parameters to PCEF 390 to implement on the network system 300. These parameters can be transmitted directly to PCEF 390, or indirectly via PCRF 350.

At step 430, PCEF 390 keeps track of a mobile device subscriber's network usage by tracking a mobile device subscriber's voice and/or data packets ("packets") that pass through PGW 330. A mobile device subscriber's packets can originate from UE 310 and travel to network 360, passing through SGW 320 and PGW 330 en route. PGW 330 can communicate with network 360 via an Rx or other suitable protocol. A mobile device subscriber's packets can also originate from network 360 and travel to UE 310, also passing through PGW 330 and SGW 320 en route. As the packets that originate from UE 310 or network 360 pass through PGW 330, PCEF 390 generates CDRs based on the CDR generation parameters that it received for the mobile device subscriber from billing system 345. For example, billing system 345 can transmit the following parameters to PCEF 390: after every 3 minutes of network usage by Mr. Smith and/or 5 megabytes of data transmitted or received by Mr. Smith, whichever threshold is reached first, generate a CDR. Applying these parameters, PCEF 390 keeps count of the time and/or data volume of Mr. Smith's network usage, as measured by the packets passing through PGW 330. After every three minutes of network usage by Mr. Smith, and/or after every five megabytes of data transmitted or received by Mr. Smith, PCEF 390 will generate a CDR. In some embodiments, PCEF 390 will communicate the generated CDR to billing system 345 through an offline billing system, e.g., OFCS 340.

As will be explained in further detail, FIGS. 5-9 illustrate example process flows of the operation of a network system (e.g., network system 300) to intelligently and dynamically generate CDRs for a mobile device subscriber according to certain embodiments of the disclosed subject matter.

Figure 5:
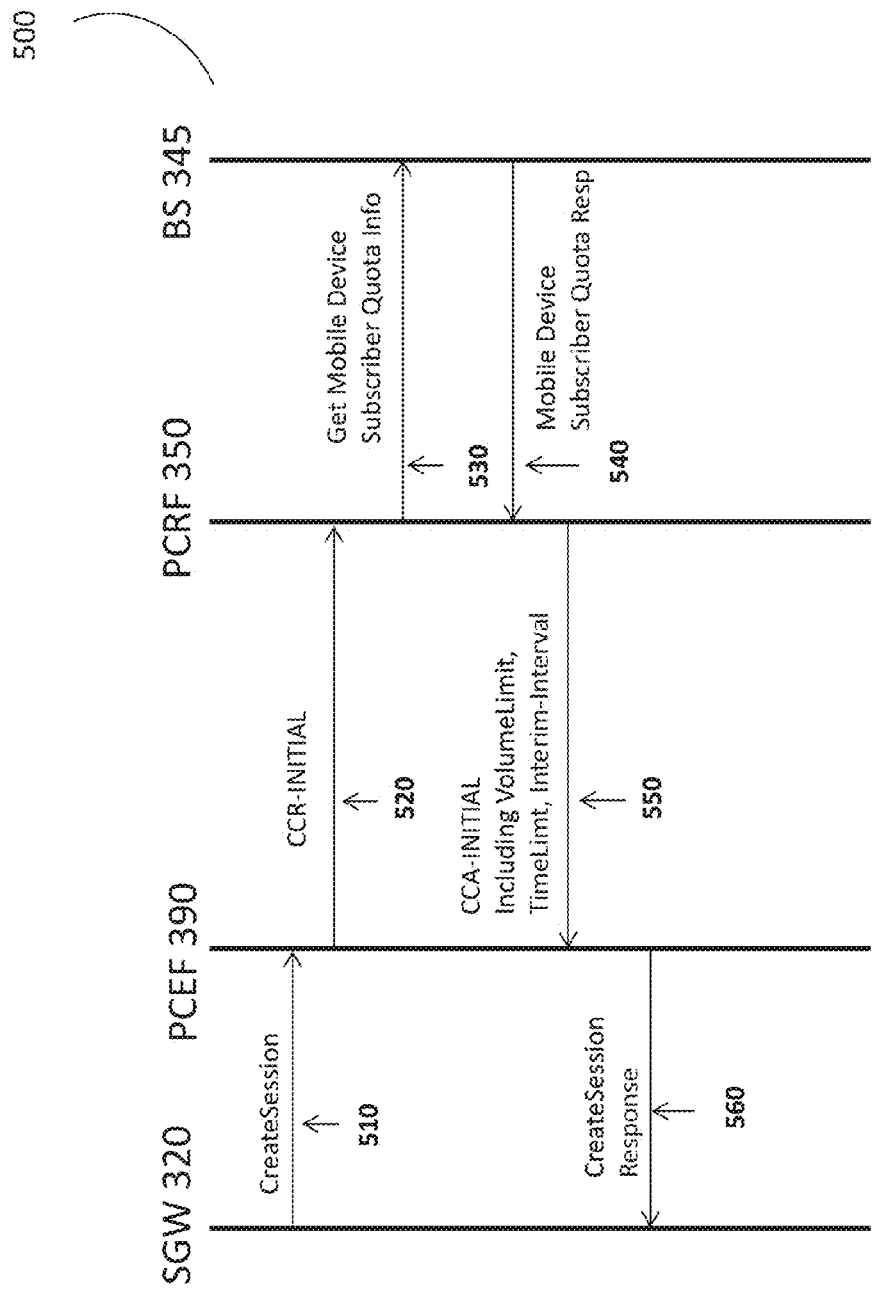
FIG. 5 is a process flow diagram of a method for use with the network system of FIG. 3 in accordance with some embodiments of the disclosed subject matter.

FIG. 5, with further reference to FIG. 3, illustrates a process flow for setting up an initial session for a mobile device subscriber wishing to use a network, in accordance with some embodiments. Process 500 can use the network system 300 and includes the process set forth below.

SGW 320 receives a request from UE 310 to begin a mobile device subscriber's session on network 360 (at 510). SGW 320 sends a create session request message to PGW 330. In some embodiments, SGW 320 communicates with PGW 330 via an S1 or other suitable protocol. Next, PGW 330 sends a credit control request initialization (CCR-Initial) message to PCRF 390 to establish a session with PCRF 390 (at 520). This request can be communicated using a Gx protocol. PCRF 390 receives the CCR-Initial message and sends a request to billing system 345 to get mobile device subscriber quota information (at 530). Mobile device subscriber quota information can include CDR generation parameters such as an interim update interval based on volume and/or time thresholds for a mobile device subscriber.

Billing system 345 creates CDR generation parameters suitable for the mobile device subscriber initiating the session request, and billing system 345 sends a mobile device subscriber quota response message to PCRF 350, including the CDR generation parameters that it created for that mobile device subscriber (at 540). PCRF 350, as part of its credit control answer (CCA-INITIAL) message to PCEF 390, can send the CDR generation parameters to PCEF 390 (at 550). PCEF 390 can include a configuration module that stores parameters to control CDR generation. After PCEF 390 receives the CDR generation parameters from PCRF 350, it updates the current parameters stored in it configuration module and applies the CDR generation parameters to control CDR generation for a mobile device subscriber. PCEF 390 sends a Create Session response to SGW 320 confirming that a session has been created for a mobile device subscriber (at 560).

Figure 6:
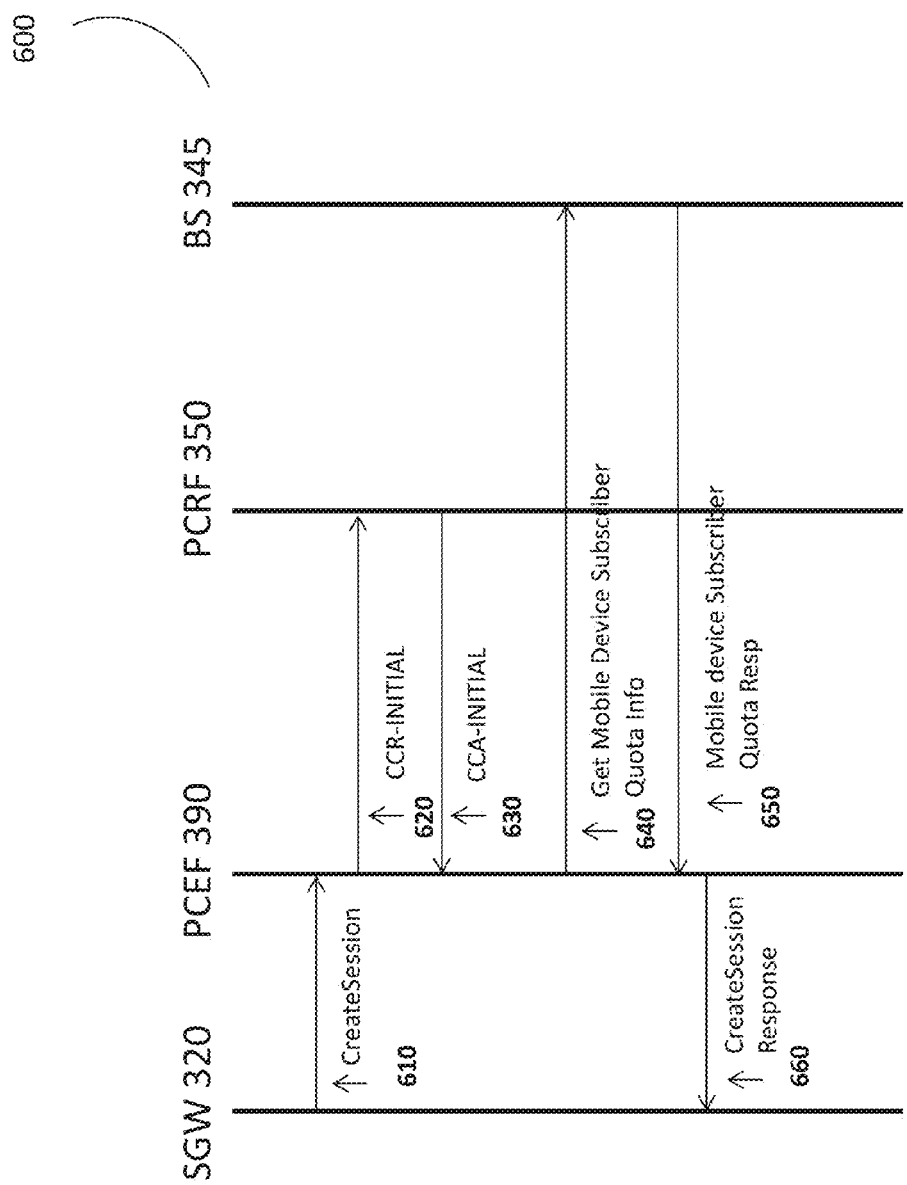
FIG. 6 is a process flow diagram of a method for use with the network system of FIG. 3 in accordance with some embodiments of the disclosed subject matter.

In accordance with other embodiments, FIG. 6, with further reference to FIG. 3, illustrates a process flow for setting up an initial session for a mobile device subscriber wishing to use a network.

This embodiment is similar to process 500 described above, except after setting up a session with PCRF 350 (i.e., after the exchange of CCR-Initial and CCA-Initial messages (at 620 and 630)), PCEF 390 requests mobile device subscriber quota information, including CDR generation parameters, directly from billing system 345, bypassing PCRF 350. Further, billing system 345 responds directly to PCEF 390 with the requested mobile device subscriber quota information (at 650). In some embodiments, PCEF 390 can use SOAP XML/REST API interfaces to communicate directly with billing system 345.

Figure 7:
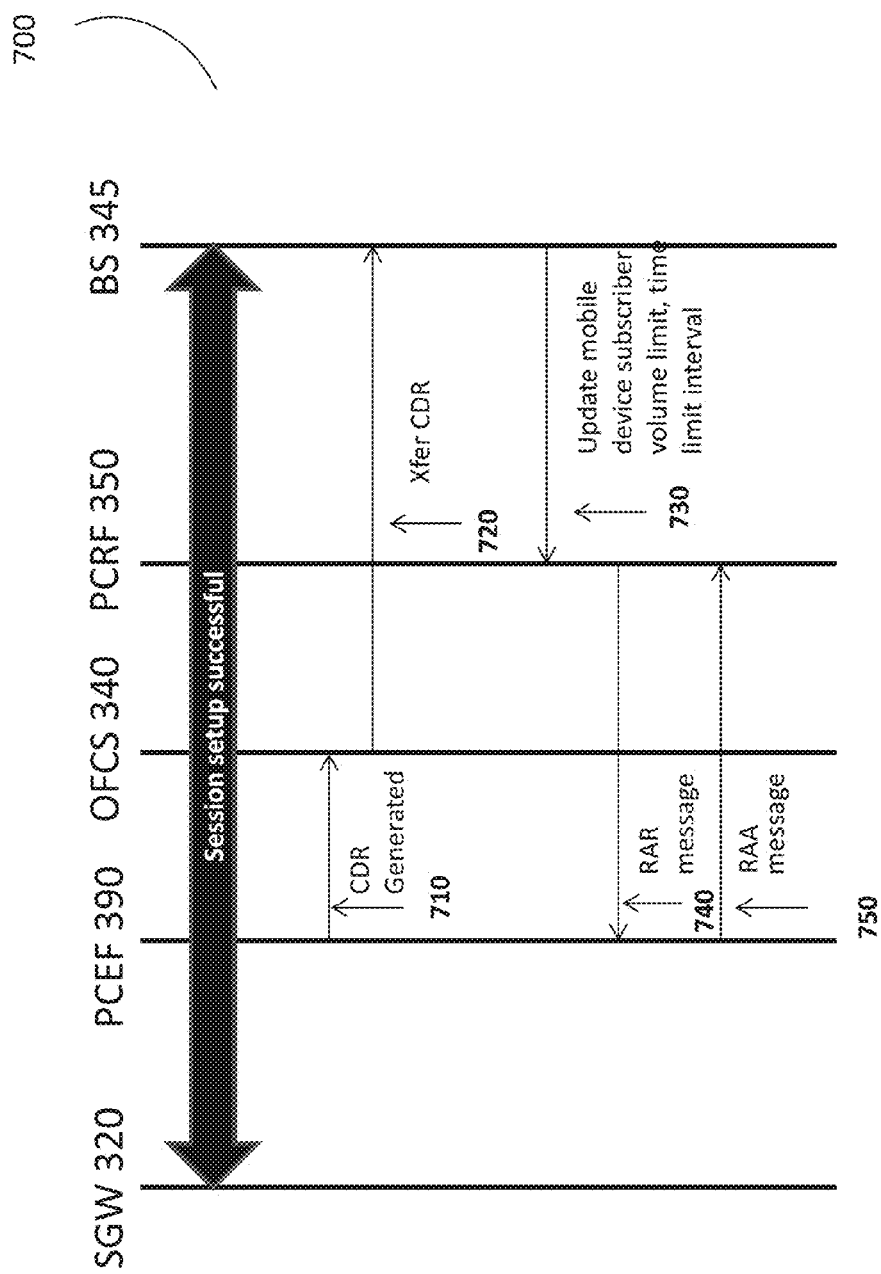
FIG. 7 is a process flow diagram of a method for use with the network system of FIG. 3 in accordance with some embodiments of the disclosed subject matter.

FIG. 7, with further reference to FIG. 3, illustrates a process flow for generating CDRs once a mobile device subscriber session has been successfully set up, in accordance with some embodiments. Process 700 can use network system 300 and includes the process set forth below. PCEF 390 generates CDRs in accordance with the parameters received from billing system 345 (at 710). PCEF 390 can send the CDRs to an offline billing system (e.g., OFCS 340) through GTPP or any offline protocol. OFCS 340 passes the generated CDRs along to billing system 345 (at 720). In other embodiments, PCEF 390 sends the CDRs directly to billing system 345 and does not use an intervening offline billing system. When billing system 345 receives a generated CDR, it checks to see whether the current interim update interval based on time and/or data volume thresholds needs to be adjusted (at 730). For example, if the CDR shows that a mobile device subscriber is at 90% of his mobile device network plan's usage quota, billing system 345 may create new CDR generation parameters (e.g., reducing the interim update interval), so that CDRs are generated more frequently.

In some embodiments, increasing CDR generation, as a mobile device subscribers' network usage increases relative to his mobile device network plan's usage quota, can be based on a fixed predetermined increase, as shown, for example, in Table 1, below:

TABLE 1

| | NETWORK USAGE % BASED ON PLAN'S NETWORK USAGE QUOTA | | | | |
|---|---|---|---|---|---|
| | 10% | 20% | 50% | 75% | 90% |
| CDR GENERATION INCREASES BY A FIXED AMOUNT | Once a week and/or every 1000 MB of data | Twice a week and/or every 500 MB of data | Three times a week and/or every 250 MB of data | Every day and/or every 100 MB of data | Twice a day and/or every 50 MB of data |

In other embodiments, increasing CDR generation, as a mobile device subscribers' network usage increases relative to his mobile device network plan's usage quota, can be based on a predetermined percentage decrease of the mobile device subscriber's current CDR update interval, as shown, for example, in Table 2 below:

TABLE 2

| | NETWORK USAGE % BASED ON PLAN'S NETWORK USAGE QUOTA | | | | |
|---|---|---|---|---|---|
| | 10% | 20% | 50% | 75% | 90% |
| CDR GENERATION INCREASES BY PERCENTAGE | Reduce interim update interval by 10% | Reduce update interval by 15% | Reduce update interval by 20% | Reduce update interval by 25% | Reduce update interval by 30% |

If billing system 345 creates new CDR generation parameters, then PCRF 350 reestablishes a session with PCEF 390, for example by sending a Gx reauthorization request (RAR message), and passes along the new CDR generation parameters (e.g., volume limit, time limit, interim interval) from billing system 345 (at 740). PCEF 390 sends a confirmation reauthorization answer (RAA) message to PCRF 350 (at 750).

Figure 8:
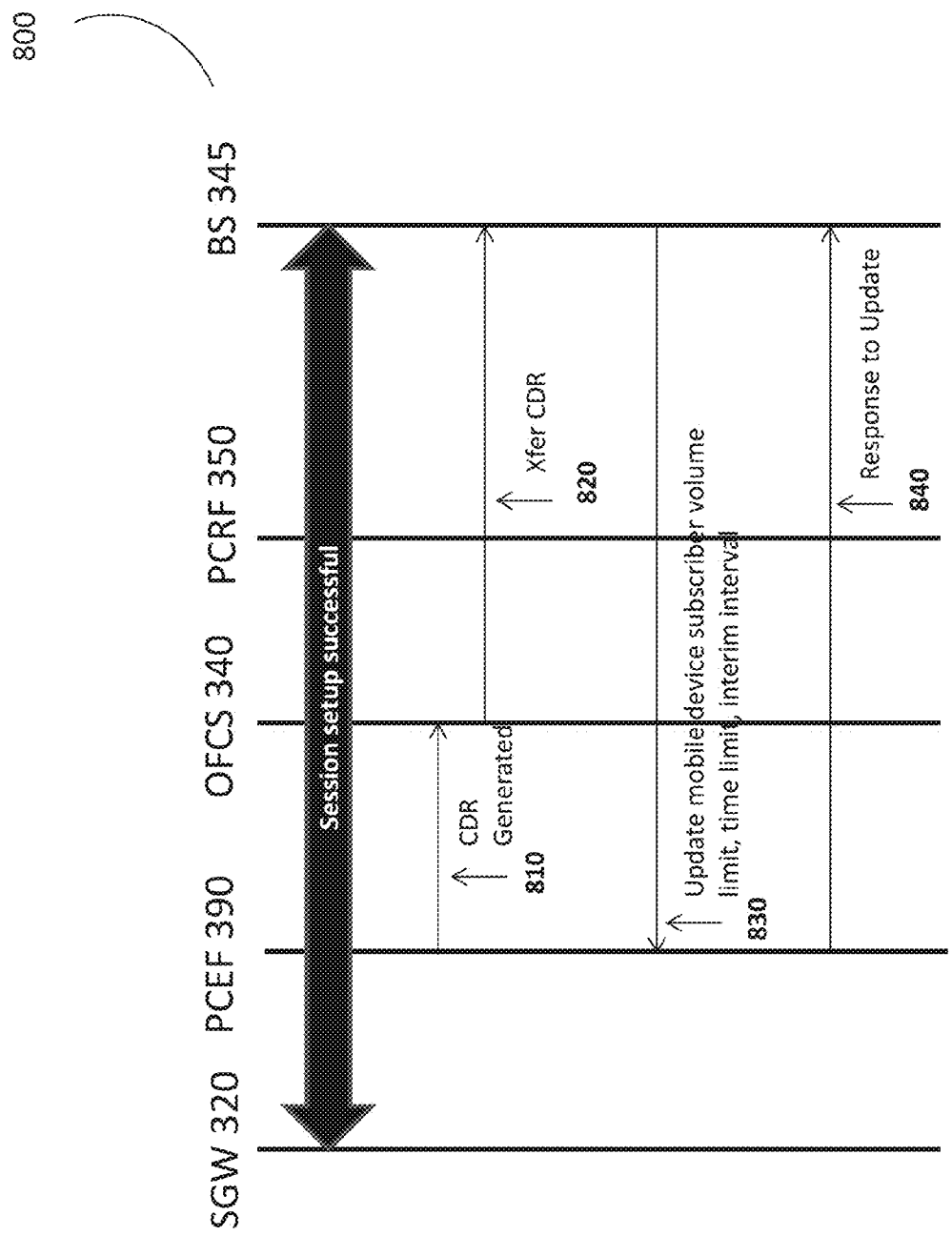
FIG. 8 is a process flow diagram of a method for use with the network system of FIG. 3 in accordance with some embodiments of the disclosed subject matter.

In accordance with other embodiments, FIG. 8, with further reference to FIG. 3, illustrates a process flow for generating CDRs, where PCRF 350 is not involved in setting up new CDR generation parameters. Generating a CDR and transferring it to billing system 345 (at 810 and 820) are similar to generating a CDR and transferring it to billing system 345 (at 710 and 720), as described above in connection with FIG. 7. However, if billing system 345 determines that the current CDR generation parameters must be adjusted, then it communicates the new parameters directly to PCEF 390 and does not involve PCRF 350 (at 830). When PCEF 390 receives the new parameters, it sends a confirmation response directly to billing system 345 (at 840).

The techniques and systems disclosed herein may be implemented as a computer program product for use with a network, computer system or computerized electronic device. Such implementations may include a series of computer instructions, or logic, fixed either on a tangible medium, such as a computer readable medium (e.g., a diskette, CD-ROM, ROM, flash memory or other memory or fixed disk) or transmittable to a network, computer system or a device, via a modem or other interface device, such as a communications adapter connected to a network over a medium.

The medium may be either a tangible medium (e.g., optical or analog communications lines) or a medium implemented with wireless techniques (e.g., Wi-Fi, cellular, microwave, infrared or other transmission techniques). The series of computer instructions embodies at least part of the functionality described herein with respect to the system. Those skilled in the art should appreciate that such computer instructions can be written in a number of programming languages for use with many computer architectures or operating systems.

Furthermore, such instructions may be stored in any tangible memory device, such as semiconductor, magnetic, optical or other memory devices, and may be transmitted using any communications technology, such as optical, infrared, microwave, or other transmission technologies.

It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

In the foregoing description, certain steps or processes can be performed on particular servers or as part of a particular engine. These descriptions are merely illustrative, as the specific steps can be performed on various hardware devices, including, but not limited to, server systems and/or mobile devices. Similarly, the division of where the particular steps are performed can vary, it being understood that no division or a different division is within the scope of the invention. Moreover, the use of "module" and/or other terms used to describe computer system processing is intended to be interchangeable and to represent logic or circuitry in which the functionality can be executed.

The invention claimed is:

1. A method of generating Call Detail Records (CDR) to optimize network usage notifications to a mobile device subscriber, the method comprising:
  determining, by a billing system module, CDR generation parameters for the mobile device subscriber based on the mobile device subscriber's network usage, wherein determining the CDR generation parameters includes at least one of increasing CDR generation when the mobile device subscriber's network usage relative to a predetermined quota is high and decreasing CDR generation when the mobile device subscriber's network usage relative to the predetermined quota is low;
  transmitting, by the billing system module, the CDR generation parameters to a Policy Charging and Enforcement Function (PCEF) module; and
  applying, by a PCEF module, the received CDR generation parameters to control CDR generation for the mobile device subscriber.

2. The method of claim 1, wherein the CDR generation parameters applied by the PCEF module is based on at least one of a predetermined time threshold and a predetermined data volume threshold.

3. The method of claim 1, wherein determining the CDR generation parameters, by the billing system module, includes at least one of increasing CDR generation when the mobile device subscriber's network usage reaches a first predetermined percentage of a network usage limit on the mobile device subscriber's mobile device network plan and decreasing CDR generation when the mobile device subscriber's usage is below a second predetermined percentage of the network usage limit on the mobile device subscriber's mobile device network plan.

4. The method of claim 1, wherein determining the CDR generation parameters, by the billing system module, includes adjusting the CDR generation parameters based on a count of a number of members participating in the mobile device subscriber's mobile device network plan.

5. The method of claim 1, wherein determining the CDR generation parameters, by the billing system module, includes adjusting the CDR generation parameters based on the mobile device subscriber's past network usage behavior.

6. The method of claim 1, wherein determining the CDR generation parameters, by the billing system module, includes adjusting the CDR generation parameters based on a billing cycle of the mobile device subscriber's mobile device network plan and independent of the mobile device subscriber's network usage, wherein a higher number of CDRs are generated at the end of the billing cycle than at the beginning of the billing cycle.

7. The method of claim 1, wherein the billing system module includes a database for storing information about the mobile device subscriber, the information including at least one of current and historical network usage for the mobile device subscriber and mobile device network plan information for call and data usage limits for the mobile device subscriber.

8. The method of claim 1, wherein the mobile device subscriber includes one of an individual mobile device subscriber, a group of mobile device subscribers that are part of a shared mobile device network plan and a group of mobile device subscribers that subscribe to the same mobile device network plan and have similar network usage characteristics.

9. The method of claim 1, wherein the mobile device subscriber has multiple mobile devices registered under a single mobile device network plan, and the mobile device subscriber's network usage is based on the multiple mobile devices' network usage.

10. The method of claim 1, further comprising:
  transmitting, by a Policy Control and Charging Rules Function (PCRF) module, information about current network usage by the mobile device subscriber to the billing system module.

11. A system for generating Call Detail Records (CDR) for a mobile device subscriber to optimize network usage notifications to a mobile device subscriber, the system comprising:
  a billing system module that is configured to:
    determine CDR generation parameters for the mobile device subscriber based on the mobile device subscriber's network usage, wherein the CDR generation parameters includes at least one of increasing CDR generation when the mobile device subscriber's network usage relative to a predetermined quota is high and decreasing CDR generation when the mobile device subscriber's network usage relative to the predetermined quota is low; and transmit the CDR generation parameters to a Policy Charging and Enforcement Function (PCEF) module; and the PCEF module that is coupled to the billing system module and is configured to apply the received CDR generation parameters to control CDR generation for the mobile device subscriber.

12. The system of claim 11, wherein the PCEF module is configured to apply the CDR generation parameters based on at least one of a predetermined time threshold and a predetermined data volume threshold.

13. The system of claim 11, wherein the billing system module is configured to determine the CDR generation parameters based on at least one of increasing CDR generation when the mobile device subscriber's network usage reaches a first predetermined percentage of a network usage limit on the mobile device subscriber's mobile device network plan and decreasing CDR generation when the mobile device subscriber's usage is below a second predetermined percentage of the network usage limit on the mobile device subscriber's mobile device network plan.

14. The system of claim 11, wherein the billing system module is configured to determine the CDR generation parameters, by adjusting the CDR generation parameters based on a count of a number of members participating in the mobile device subscriber's mobile device network plan.

15. The system of claim 11, wherein the billing system module is configured to determine the CDR generation parameters based on the mobile device subscriber's past network usage behavior.

16. The system of claim 11, wherein the billing system module is configured to determine the CDR generation parameters, by adjusting the CDR generation parameters based on at least one of a billing cycle of the mobile device subscriber's mobile device network plan and independent of the mobile device subscriber's network usage, wherein a higher number of CDRs are generated at the end of the billing cycle than at the beginning of the billing cycle.

17. The system of claim 11, wherein the billing system module includes a database for storing information about a mobile device subscriber, the information including at least one of current and historical network usage for the mobile device subscriber and mobile device network plan information for call and data usage limits for the mobile device subscriber.

18. The system of claim 11, wherein the mobile device subscriber includes one of an individual mobile device subscriber, a group of mobile device subscribers that are part of a shared mobile device network plan, and a group of mobile device subscribers that subscribe to the same mobile network plan and have similar network usage characteristics.

19. The system of claim 11, wherein the mobile device subscriber has multiple mobile devices registered under a single mobile device network plan, and the mobile device subscriber's network usage is based on the multiple mobile devices' network usage.

20. The system of claim 11, further comprising:
a Policy Control and Charging Rules Function (PCRF) module configured to transmit information about current network usage by the mobile device subscriber to the billing system module.

* * * * *